United States Patent
Korton

(10) Patent No.: US 6,697,448 B1
(45) Date of Patent: Feb. 24, 2004

(54) NEUTRONIC FUEL ELEMENT FABRICATION

(75) Inventor: George Korton, Cincinnati, OH (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 04/594,943

(22) Filed: Nov. 16, 1966

(51) Int. Cl.[7] ................................................ G21C 3/04
(52) U.S. Cl. ...................... 376/261; 376/409; 376/421; 376/451; 219/121.14; 228/193; 228/195; 228/183; 29/890.043; 29/470; 29/473.3; 29/471.5; 29/475; 29/400; 264/5
(58) Field of Search .............................. 29/400 W, 470, 29/473.3, 475, 471.5, 890.043, 400; 176/67, 72, 83; 264/0.5; 376/261, 409, 421, 451; 219/121.14; 228/193, 195, 183

(56) References Cited

U.S. PATENT DOCUMENTS

| | | | | |
|---|---|---|---|---|
| 2,969,312 A | * | 1/1961 | Monson | 176/83 X |
| 3,109,797 A | * | 11/1963 | Maxwell | 376/435 |
| 3,135,665 A | * | 6/1964 | Koutz et al. | 376/423 |
| 3,161,950 A | * | 12/1964 | Cobb | 29/471.5 |
| 3,186,913 A | * | 6/1965 | Weisner et al. | 376/361 |
| 3,274,068 A | * | 9/1966 | Koutz et al. | 376/423 |
| 3,291,699 A | * | 12/1966 | Trickett et al. | 376/423 |
| 3,291,870 A | * | 12/1966 | Allison | 176/67 X |
| 3,366,549 A | * | 1/1968 | Trickett et al. | 376/383 |
| 3,422,523 A | * | 1/1969 | Kling | 228/131 |

(List continued on next page.)

Primary Examiner—Michael J. Carone
(74) Attorney, Agent, or Firm—Emily G. Schneider; Paul A. Gottlieb

(57) ABSTRACT

This disclosure describes a method for metallurgically bonding a complete leak-tight enclosure to a matrix-type fuel element penetrated longitudinally by a multiplicity of coolant channels. Coolant tubes containing solid filler pins are disposed in the coolant channels. A leak-tight metal enclosure is then formed about the entire assembly of fuel matrix, coolant tubes and pins. The completely enclosed and sealed assembly is exposed to a high temperature and pressure gas environment to effect a metallurgical bond between all contacting surfaces therein. The ends of the assembly are then machined away to expose the pin ends which are chemically leached from the coolant tubes to leave the coolant tubes with internal coolant passageways.

The invention described herein was made in the course of, or under, a contract with the U.S. Atomic Energy Commission. It relates generally to fuel elements for neutronic reactors and more particularly to a method for providing a leak-tight metal enclosure for a high-performance matrix-type fuel element penetrated longitudinally by a multiplicity of coolant tubes.

The planned utilization of nuclear energy in high-performance, compact-propulsion and mobile power-generation systems has necessitated the development of fuel elements capable of operating at high power densities. High power densities in turn require fuel elements having high thermal conductivities and good fuel retention capabilities at high temperatures.

A metal clad fuel element containing a ceramic phase of fuel intimately mixed with and bonded to a continuous refractory metal matrix has been found to satisfy the above requirements. Metal coolant tubes penetrate the matrix to afford internal cooling to the fuel element while providing positive fuel retention and containment of fission products generated within the fuel matrix. Metal header plates are bonded to the coolant tubes at each end of the fuel element and a metal cladding or can completes the fuel-matrix enclosure by encompassing the sides of the fuel element between the header plates.

9 Claims, 2 Drawing Sheets

U.S. PATENT DOCUMENTS

| | | | | |
|---|---|---|---|---|
| 3,438,858 A | * | 4/1969 | Howard et al. | 376/411 |
| 3,439,073 A | * | 4/1969 | Howard et al. | 264/0.5 |
| 3,475,340 A | * | 10/1969 | Pollock | 252/640 |
| 3,494,785 A | * | 2/1970 | Barr et al. | 427/6 |
| 3,793,832 A | * | 2/1974 | Moon | 376/318 |
| 4,060,454 A | * | 11/1977 | Miertschin et al. | 376/427 |
| 4,202,849 A | * | 5/1980 | Miertschin et al. | 264/0.5 |
| 6,212,250 B1 | * | 4/2001 | Korton et al. | 376/261 |

* cited by examiner

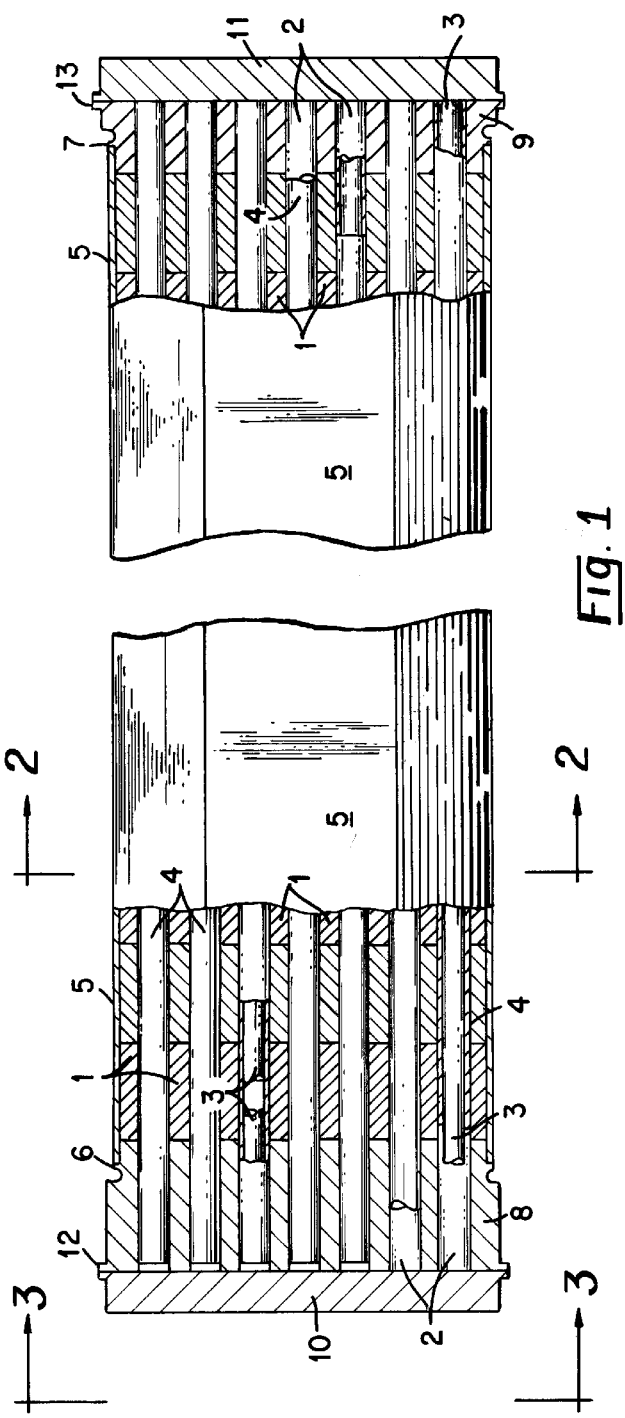
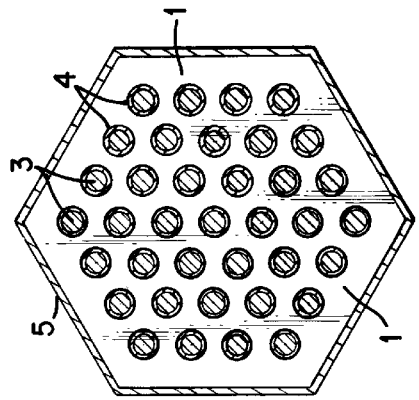
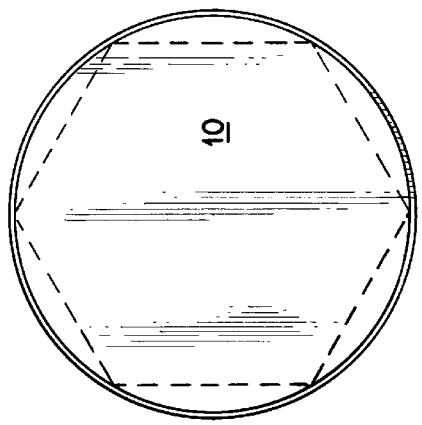

NEUTRONIC FUEL ELEMENT FABRICATION

The ability of the fuel element to operate at a high power density is dependent to a large extent upon the nature of the bond existing between the fuel matrix and coolant tubes extending there-through, particularly where the cladding is a cooling surface. Large temperature drops with resultant losses in efficiency and possible physical damage to the matrix and coolant tubes occur where no metallurgical bond exists between the fuel matrix and coolant tubes.

The complete fuel-matrix enclosure, which comprises the coolant tubes, header plates, and cladding must be of the highest integrity so as to avoid losses of fission products at the extreme operating conditions experienced by the fuel element.

One method for metallurgically bonding a complete leak-tight metal enclosure to a matrix-type fuel element penetrated longitudinally by a multiplicity of coolant channels is described in copending application of common assignee Ser. No. 472,759. In that application, the metallurgical bond is effected by providing a helium leak-tight enclosure of coolant tubes, header plates and other cladding to the fuel matrix, and exposing the entire assembly to a high temperature and pressure gas environment to effect a diffusion bond between the matrix and enclosure. It has been found that defects often develop in the coolant tubes during the bonding operation, however, due to the tubing expanding into voids existing in the wall of the coolant channels or through the aggravation of already existing cracks inside the tubing which tend to enlarge as the tubing is expanded within the coolant channels.

Exact hydraulic diameters cannot be readily achieved in the coolant tubes when they are expanded within the coolant channels against the fuel matrix. The resulting variations in hydraulic diameters result in coolant flow and temperature variations in an operating fuel element.

The large number of individual leak-tight welds, which are necessary according to the above described method to provide a leak-tight enclosure which permits high pressure gas within the coolant tubes during a bonding operation, increases the cost of fabrication and the probability of failure of the bonding operation due to leaks in one or more of the welds.

It is, accordingly, a general object of the invention to provide a method for metallurgically bonding a complete leak-tight metal enclosure to a matrix-type fuel element which is penetrated longitudinally by a multiplicity of coolant channels.

Another object of the invention is to provide a method for metallurgically bonding a complete metal enclosure to a matrix-type fuel element which is penetrated longitudinally by a multiplicity of coolant channels wherein the deleterious effect of voids in the coolant channel walls on the coolant tubes disposed within the channels is largely obviated.

Still another object of the invention is to provide a method for metallurgically bonding a complete leak-tight metal enclosure to a matrix-type fuel element which is penetrated longitudinally by a multiplicity of coolant channels wherein a minimum number of welds are required.

Other objects of the invention will be apparent from an examination of the following description of the invention and the appended drawings, wherein:

FIG. 1 is a longitudinal plan view, partly in section, of a fuel element assembly which has been prepared for a pressure-bonding operation in accordance with the present invention;

FIG. 2 is a transverse sectional view of the assembly of FIG. 1 taken along line 2—2 showing the arrangement of coolant tubes and fuel matrix therein;

FIG. 3 is an end view of the assembly of FIG. 1 showing the closure plate which seals both ends thereof during a pressure bonding operation;

Figure 4:
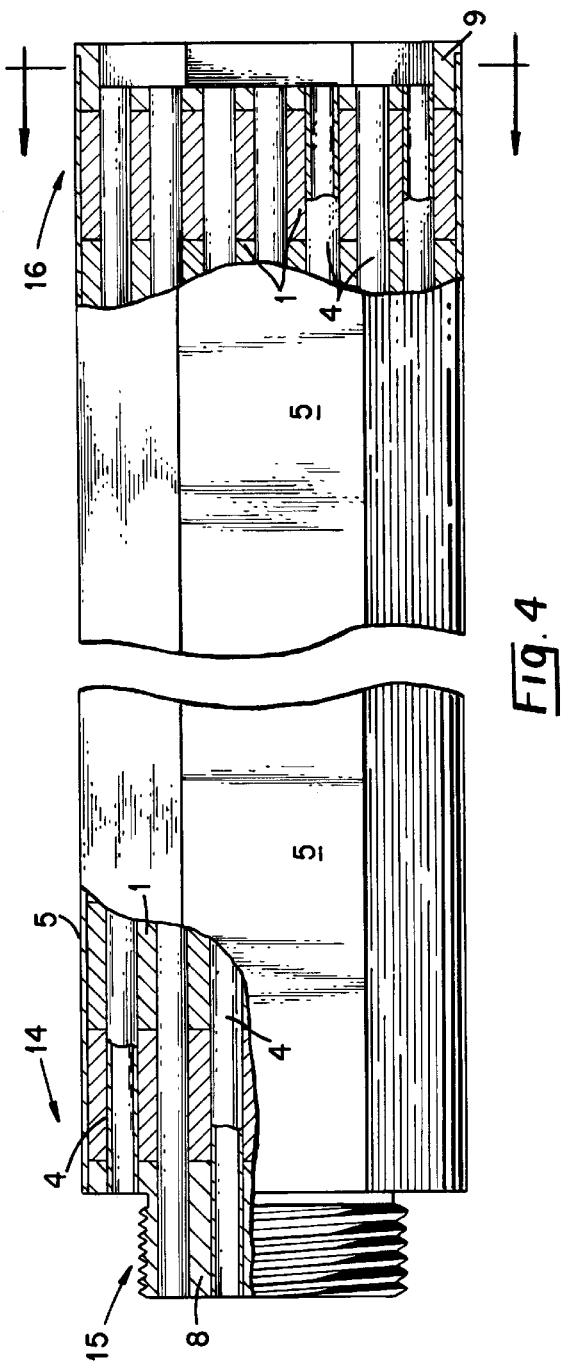
FIG. 4 is a longitudinal plan view, partly in section, of the fuel element assembly of FIG. 1 after pressure bonding, machining of its header plates and selective leaching of the filler pins from its coolant tubes.

In accordance with the present invention, an improved method for metallurgically bonding a complete leak-tight enclosure to a matrix-type fuel element penetrated longitudinally by a multiplicity of coolant channels is provided. Coolant tubes containing solid filler pins are disposed in the coolant channels penetrating the fuel matrix. Header plates, perforated to match the coolant channels in the fuel matrix, are disposed at each end of the fuel matrix to accommodate the coolant tube ends. Metal cladding is placed about the fuel matrix and welded to the header plates. Metal cover plates cover the perforated ends of the header plates and are welded to the header plates under vacuum conditions to complete a leak-tight evacuated enclosure for the fuel matrix and coolant tubes disposed therein. The completely enclosed and sealed fuel element assembly is then exposed to a high temperature and pressure gas environment so as to effect a metallurgical bond between the contacting surfaces of the fuel matrix, coolant tubes, header plates and cladding. After the operation is completed, the ends of the assembly are machined to expose the coolant tube ends and filler pins contained therein. Selective leaching is used to remove the filler pins from the coolant tubes so as to leave the coolant tubes with internal coolant passageways of the proper hydraulic diameter. Final machining of the header plates then prepares the fuel element for mounting within a reactor core.

In order to facilitate an understanding of the invention, reference is made to the drawings wherein like reference characters designate like or corresponding parts throughout the several views. A fuel element assembly which has been prepared for a hot gas pressure-bonding operation according to this invention is illustrated in FIG. 1. A fuel matrix 1, with a refractory metal such as tungsten forming the matrix material and uranium dioxide as fuel, is penetrated longitudinally by a multiplicity of coolant channels 2. The fuel matrix is formed from a plurality of axially aligned hexagonal fuel compacts. Sacrificial metal pins 3 are fitted within the bores of refractory metal coolant tubes 4 which are, in turn, disposed within coolant channels 2. The hexagonal configuration of the fuel compacts and the manner in which the filler pins 3 and coolant tubes 4 are disposed therein will be more apparent from an examination of FIG. 2 where a sectional view of the fuel element assembly of FIG. 1 is shown.

FIGS. 1, 2 and 3 also illustrate how a refractory metal cladding or can 5 is used to enclose the lateral surface of the fuel assembly so as to prevent the escape of fission products therefrom during operation in a neutronic reactor. The refractory metal can 5 is butt-welded to lips 6 and 7 extending about the lateral periphery of header plates 8 and 9, respectively. A relatively large area of contact is provided between the refractory metal can and header plates 8 and 9 to ensure a satisfactory diffusion bond therebetween during the subsequent high-temperature and pressure-bonding operation.

Circular closure plates 10 and 11 are placed over header plates 8 and 9, respectively, and butt-welded thereto about their peripheries to complete a leak-tight enclosure for the fuel element assembly during the subsequent pressure bonding operation. Header plates 8 and 9, which are otherwise hexagonal in shape, are provided with circular flanges 12 and 13 to facilitate the welding operation. FIG. 3 provides an end view of closure plate 10 which is identical to closure plate 11.

Figure 5:
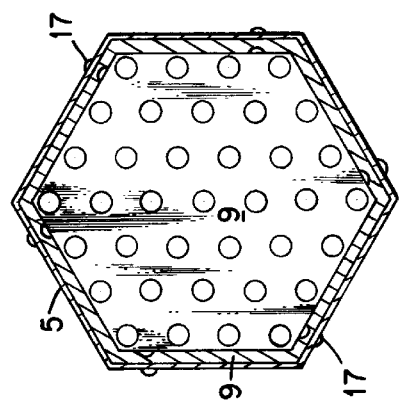
FIG. 5 is an end view of the fuel element of FIG. 4.

FIGS. 4 and 5 are a plan and an end view, respectively, of the fuel element assembly of FIG. 1 after it has been pressure bonded, its header plates 8 and 9 machined, and filler pins 3 chemically leached from coolant tubes 4 to provide a finished fuel element. As shown at end 14 of the finished fuel element, closure plate 10 has been removed and header plate 8 machined to provide a threaded central extension 15 suitable for engagement with a fuel element latching mechanism. Other suitable configurations for engaging fuel element latching mechanisms will be apparent to those skilled in the nuclear reactor art. At end 16 of the finished fuel element, closure plate 11 has been removed and a hexagonal depression encompassing all of the coolant tubes has been machined into header plate 9. The hexagonal depression facilitates making spacing nubs 17 which permit a multiplicity of fuel elements to be assembled closely together in a reactor core with only point contact therebetween. The close assembly minimizes neutron streaming and coolant flow induced vibration, while the slight spacing provided by the nubs permits thermal expansion of the fuel elements without excessive interference.

The fuel element assembly illustrated in FIG. 1 must be leak-tight to the hot high-pressure gas used in a bonding operation in order that a complete metallurgical bond will be developed between the fuel matrix, header plates, coolant tubes and cladding. Any leakage through the enclosure during the bonding operation will tend to equalize the pressure within the enclosure with that outside, so that a pressure differential no longer exists to press the cladding against the fuel matrix. Since the development of a diffusion bond between the cladding, fuel matrix and coolant tubes depends in part upon their being pressed together, no diffusion bond will develop in the presence of an enclosure leak.

In a typical fuel element fabrication done in accordance with the present invention, a fuel element assembly similar to that shown in FIG. 1 was assembled using electron beam welding in vacuum to join tantalum enclosure components as taught herein. Solid molybdenum pins were inserted in the coolant tube bores which were in turn placed within coolant channels penetrating the fuel matrix and header plates. Following the welding of closure plates to the header plates, the entire assembly was heated to 3000°–3200° F. and subjected to helium gas at 10,000 psig for 1–1½ hours. Because of the pressure differential between the interior and exterior of the assembly, all clearances within the fuel element assembly were eliminated and all corresponding parts were brought into intimate contact by contraction upon the molybdenum pins.

During the pressure bonding operation, solid state diffusion occurs between all metal components which are in contact, thereby effecting a metallurgical bond between fuel segments and the coolant tubes, header plates and outer hexagonal cladding or can. The coolant tubes are also bonded to the header plates and to the molybdenum pins within their bores. Due to the isostatic nature of the pressure application, no deformation of the molybdenum pins occurs so that the pins fix the hydraulic diameter of the coolant tube channels.

Following the bonding operation, the closure plates are machined away to expose the molybdenum pins within the bores of the coolant tubes. The fuel element assembly is then immersed in a heated dilute solution of nitric and sulfuric acid which preferentially dissolves the molybdenum pins without attacking the tantalum coolant tubes and other cladding.

The significant advantages of this fuel element fabrication method include the simplicity of the final closure or sealing operation prior to the bonding operation and the control of the desired coolant tube hydraulic diameter through the use of sacrificial molybdenum pins within the coolant tube bores. Another advantage is that the quality level of the refractory metal tubing is not as critical to successful bonding and to the integrity of the finished fuel element as it would be if the bores of the coolant tube were exposed to the high temperature and pressure gas during the bonding operation. Exposure of the tube bores in such a manner tends to aggravate existing defects in the tubing as well as increasing the effect of any defects in the coolant channel wall when the tubing expands against the wall. The method of this invention, on the other hand, thickens the slightly oversize coolant tube wall by compressing the tube against the filler pin and thus tends to mitigate the effect of existing coolant tube defects rather than aggravating them.

Although only tantalum closure components have been referred to in the above description, the closure design and bonding technique can be applied to other refractory metals such as tantalum-10 tungsten, tantalum-8 tungsten-2 hafnium, tungsten, tungsten-25 rhenium, molybdenum and molybdenum base alloys, columbium and others. When molybdenum coolant tubing is used, however, dissimilar metal sacrificial filler pins must be used in order that they may be selectively leached from the coolant tubes. Dissimilar refractory metals may be used for tubing and for the inner header plate without encountering serious welding problems inasmuch as the tubing-to-header plate joints are effected by solid state diffusion bonding.

In an alternative embodiment, a fuel element assembly may be provided wherein filler pins plated with refractory metal are used in place of filler pins disposed in refractory metal tubes. Such an embodiment may be desirable where a supply of a particular refractory metal tubing is not available in the quantity and/or of the quality desired.

The above description of the invention was offered for illustrative purposes only, and should not be interpreted in a limiting sense. It is intended rather that the invention be limited only by the claims appended hereto.

What is claimed is:

1. A method of fabricating a neutronic fuel element comprising an elongated fuel matrix penetrated longitudinally by a multiplicity of metal coolant tubes, wherein said fuel matrix is metallurgically bonded to said metal coolant tubes, said method comprising the steps of:

(a) providing oversize coolant channels through said fuel matrix;

(b) disposing oversize metal coolant tubes within said coolant channels, each of said tubes having an outside diameter substantially equal to the diameter of said oversize coolant channels, and an oversize inside diameter;

(c) placing cylindrical pins within the bores of said coolant tubes, said pins having diameters substantially equal to the final desired inside diameter of said coolant tubes;

(d) applying pressure transversely to said fuel matrix at high temperature to establish a metallurgical bond between said fuel matrix and said coolant tubes and to squeeze said coolant tubes onto said pins; and (e) selectively leaching said pins from said coolant tubes.

2. The method of claim 1 wherein molybdenum pins are placed within tantalum coolant tubes.

3. The method of claim 2 wherein a dilute solution of nitric and sulfuric acid is used to leach said pins from said coolant tubes.

4. The method of claim 1 wherein high temperature and pressure gas is used to apply pressure to said fuel matrix.

5. The method of claim 1 wherein said fuel matrix comprises uranium fuel disposed within a tungsten matrix.

6. A method for providing a leak-tight metal enclosure to a fuel matrix penetrated by coolant channels, wherein the mutually contacting surfaces of said metal enclosure and said fuel matrix are metallurgically bonded, said method comprising the steps of:

(a) placing a metal cladding about the lateral surface of said fuel matrix;

(b) disposing oversize metal coolant tubes within said coolant channels, each of said tubes having an outside diameter substantially equal to the diameter of said coolant channels, and an oversize inside diameter;

(c) placing cylindrical pins within the bores of said coolant tubes, said pins having diameters substantially equal to the final desired inside diameter of said coolant tubes;

(d) placing perforated metal header plates at each end of said fuel matrix, said coolant tubes passing through said header plates;

(e) welding, under vacuum, the ends of said cladding to said header plates;

(f) welding, under vacuum, metal closure plates over said header plates to seal the ends thereof and complete a leak-tight metal enclosure about said fuel matrix;

(g) exposing the assembly comprising the fuel matrix and metal enclosure to a gas at high temperature and pressure;

(h) machining said closure plates and header plates to expose the ends of said pins; and (i) selectively leaching said pins from said coolant tubes.

7. The method of claim 6 wherein molybdenum pins are placed within tantalum coolant tubes.

8. The method of claim 6 wherein said fuel matrix comprises a uranium fuel disposed within a tungsten matrix.

9. The method of claim 6 wherein tantalum cladding, header plates and coolant tubing are used to provide a leak-tight enclosure to a fuel matrix comprising uranium fuel disposed within a tungsten matrix.

* * * * *